US012335780B2

(12) United States Patent
Seok et al.

(10) Patent No.: US 12,335,780 B2
(45) Date of Patent: Jun. 17, 2025

(54) APPARATUS AND METHODS FOR EHT MULTI-BAND A-MSDU OPERATION

(71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US); Gabor Bajko, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 137 days.

(21) Appl. No.: 17/094,348

(22) Filed: Nov. 10, 2020

(65) Prior Publication Data

US 2021/0144589 A1 May 13, 2021

Related U.S. Application Data

(60) Provisional application No. 62/934,038, filed on Nov. 12, 2019.

(51) Int. Cl.
*H04W 28/082* (2023.01)
*H04W 28/06* (2009.01)
*H04W 80/02* (2009.01)
*H04W 84/12* (2009.01)

(52) U.S. Cl.
CPC ....... *H04W 28/082* (2023.05); *H04W 28/065* (2013.01); *H04W 80/02* (2013.01); *H04W 84/12* (2013.01)

(58) Field of Classification Search
None
See application file for complete search history.

(56) References Cited

U.S. PATENT DOCUMENTS

| 2005/0265302 A1* | 12/2005 | Nishibayashi | H04L 45/00 370/349 |
| 2006/0182145 A1* | 8/2006 | Seo | H04L 45/24 370/471 |
| 2009/0129386 A1* | 5/2009 | Rune | H04L 12/4641 370/392 |

(Continued)

FOREIGN PATENT DOCUMENTS

| EP | 2667682 A1 | 11/2013 |
| WO | 2018196600 A1 | 11/2018 |
| WO | 2019050704 A1 | 3/2019 |

*Primary Examiner* — Wutchung Chu
*Assistant Examiner* — Berhanu D Belete

(57) ABSTRACT

Multi-link operations can provide higher network throughput and improved network flexibility compared to traditional techniques for wireless communication. Embodiments of the present invention provide techniques for simultaneously transmitting frames of an A-MSDU over multiple links in a multi-link operation between wireless devices (e.g., a wireless STA and a wireless AP). The A-MSDU can be aggregated to satisfy capability requirements of the transmitting device and/or the receiving device. Moreover, the A-MSDU can be fragmented, for example, to satisfy an MPDU length requirement of the transmitting device and/or the receiving device. Some embodiments disclosed herein use a virtual mac address of an LLC sublayer interface to define parameters values of an A-MSDU sub-frame header (e.g., SA and DA) for routing the respective frame to the LLC sublayer interface of the receiving device.

17 Claims, 10 Drawing Sheets

(56) References Cited

U.S. PATENT DOCUMENTS

| | | | |
|---|---|---|---|
| 2012/0201196 A1* | 8/2012 | Merlin | H04W 28/065 370/328 |
| 2013/0301553 A1* | 11/2013 | Klein | H04W 76/12 370/329 |
| 2013/0322467 A1* | 12/2013 | Atef | H04L 49/9057 370/474 |
| 2014/0036775 A1* | 2/2014 | Asterjadhi | H04W 28/06 370/328 |
| 2014/0079016 A1* | 3/2014 | Dai | H04L 5/0041 370/329 |
| 2014/0293936 A1* | 10/2014 | Wang | H04L 12/4625 370/329 |
| 2015/0010019 A1* | 1/2015 | Bao | H04L 69/166 370/474 |
| 2015/0124704 A1* | 5/2015 | Asterjadhi | H04L 69/24 370/328 |
| 2015/0341966 A1* | 11/2015 | Seok | H04W 76/10 370/315 |
| 2016/0173662 A1* | 6/2016 | Seok | H04L 1/1896 370/252 |
| 2016/0182205 A1* | 6/2016 | Asterjadhi | H04L 1/1685 370/329 |
| 2017/0019880 A1* | 1/2017 | Stacey | H04L 69/324 |
| 2017/0150493 A1* | 5/2017 | Seok | H04B 7/0617 |
| 2017/0230964 A1* | 8/2017 | Park | H04W 72/21 |
| 2017/0373813 A1* | 12/2017 | Asterjadhi | H04W 24/02 |
| 2018/0124866 A1* | 5/2018 | Asterjadhi | H04W 88/08 |
| 2018/0176929 A1* | 6/2018 | Ryu | H04W 72/56 |
| 2018/0183548 A1* | 6/2018 | Gan | H04W 28/06 |
| 2018/0183723 A1* | 6/2018 | Cariou | H04L 69/22 |
| 2018/0206174 A1* | 7/2018 | Zhou | H04B 1/0483 |
| 2018/0262951 A1 | 9/2018 | Jiang et al. | |
| 2018/0338325 A1* | 11/2018 | Ryu | H04W 72/23 |
| 2019/0075583 A1* | 3/2019 | Park | H04W 28/06 |
| 2019/0098565 A1* | 3/2019 | Cherian | H04W 48/16 |
| 2019/0141572 A1* | 5/2019 | Zaks | H04W 12/106 |
| 2019/0141747 A1* | 5/2019 | Bang | H04W 84/12 |
| 2019/0150214 A1* | 5/2019 | Zhou | H04L 1/1621 370/329 |
| 2019/0159245 A1* | 5/2019 | Park | H04W 84/12 |
| 2019/0268098 A1* | 8/2019 | Chun | H04L 1/1671 |
| 2019/0289636 A1* | 9/2019 | Bang | H04W 74/08 |
| 2019/0327771 A1* | 10/2019 | Ahn | H04B 7/0417 |
| 2019/0335454 A1 | 10/2019 | Huang et al. | |
| 2019/0364555 A1* | 11/2019 | Huang | H04W 72/048 |
| 2019/0380038 A1* | 12/2019 | Bang | H04W 16/14 |
| 2020/0021400 A1* | 1/2020 | Cherian | H04L 5/0055 |
| 2020/0037288 A1* | 1/2020 | Huang | H04W 72/30 |
| 2020/0053827 A1* | 2/2020 | Chan | H04L 43/106 |
| 2020/0221545 A1* | 7/2020 | Stacey | H04W 84/12 |
| 2020/0336520 A1* | 10/2020 | Redding | H04L 65/70 |
| 2021/0126947 A1* | 4/2021 | Wang | H04L 63/162 |
| 2021/0160034 A1* | 5/2021 | Seok | H04L 1/1671 |
| 2021/0176019 A1* | 6/2021 | Wang | H04L 1/1607 |
| 2021/0227547 A1* | 7/2021 | Chitrakar | H04W 36/06 |

* cited by examiner

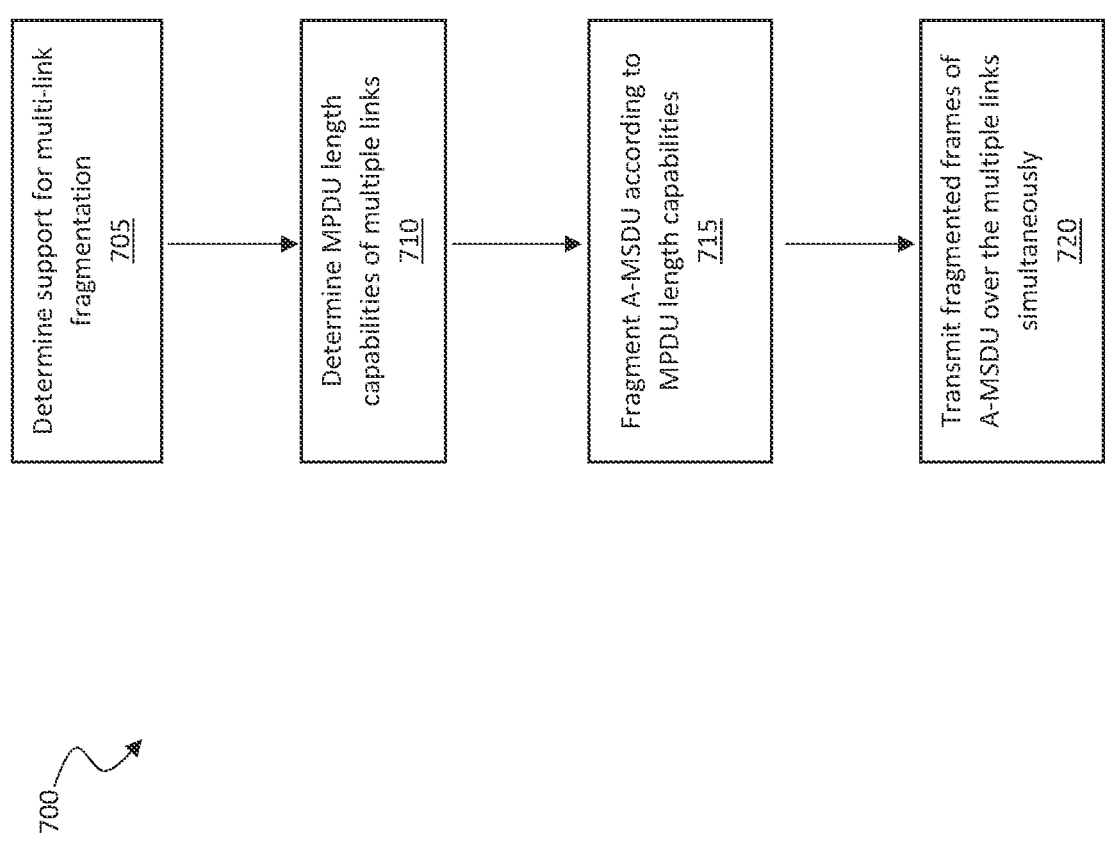

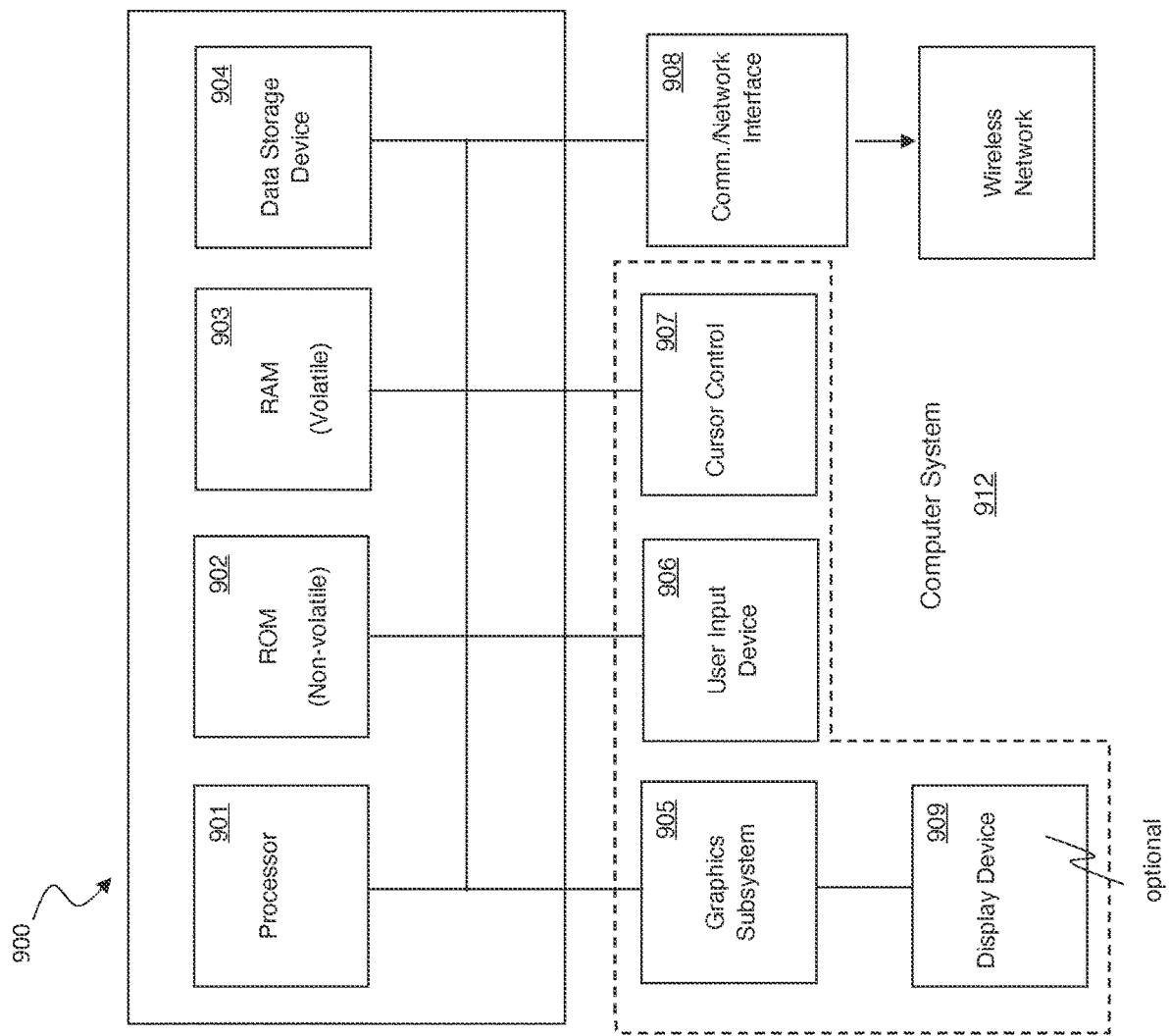

APPARATUS AND METHODS FOR EHT MULTI-BAND A-MSDU OPERATION

CROSS-REFERENCE TO RELATED APPLICATIONS

This application claims the benefit of and priority to provisional patent application Ser. No. 62/934,038, with filing date Nov. 12, 2019, which is hereby incorporated by reference in its entirety.

FIELD

Embodiments of the present invention generally relate to the field of wireless communications. More specifically, embodiments of the present invention relate to systems and methods for simultaneously transmitting frames over multiple links in a wireless network.

BACKGROUND

Modern electronic devices typically send and receive data with other electronic devices wirelessly using Wi-Fi, and many of these devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

In some cases, the use of a single band may not satisfy the bandwidth needs of certain devices. Therefore, some developing approaches to wireless communication increase communication bandwidth by operating on multiple bands concurrently (technically called link aggregation or multi-link operation). Multi-link operations can provide higher network throughput and improved network flexibility compared to traditional techniques for wireless communication.

Under existing standards, frame aggregation can be used to collect frames to be transmitted to one or multiple destinations and enclose them in a single 802.11n frame for increased efficiency. An Aggregate MAC Service Data Unit (A-MSDU) includes sub-frame headers having destination address (DA) and sender address (SA) parameter values that map to the same receiver address (RA) and transmitter address (TA) values. However, it is currently difficult to define the destination address (DA) and source address (SA) in an A-MSDU sub-frame header using multi-link operations for fragmented frames because MAC service data unit (MSDU) aggregation is performed before MAC protocol data unit (MPDU) generation.

Moreover, the wireless AP requires a means to determine the capabilities of the associated devices, for example, to determine if the recipient wireless station (STA) supports multi-link fragmentation and to determine A-MSDU capability requirements of the recipient STA. Each MAC entity of the recipient STA can have different A-MSDU capabilities and configurations, such as different numbers of MSDUs that can be carried in an A-MSDU, different maximum MPDU lengths that the STA is capable of receiving, and different maximum A-MSDU lengths that the STA is capable of receiving. Transmitting data to different MAC entities having different A-MSDU capabilities can lead to performance inefficiencies when the different A-MSDU capabilities are not accounted for by the transmitting device.

SUMMARY

Accordingly, embodiments of the present invention provide techniques for simultaneously transmitting frames of an A-MSDU over multiple links in a multi-link operation between wireless devices (e.g., a wireless STA and a wireless access point (AP)). The A-MSDU can be aggregated to satisfy capability requirements of the transmitting device and/or the receiving device. Moreover, the A-MSDU can be fragmented, for example, to satisfy an MPDU length requirement of the transmitting device and/or the receiving device. Some embodiments disclosed herein use a virtual mac address of an logical link control (LLC) sublayer interface to define parameters values of an A-MSDU sub-frame header (e.g., SA and DA) for routing the respective frame to the LLC sublayer interface of the receiving device.

According to one embodiment, a method of transmitting data by a transmitting device in a multi-link operation over a wireless network is disclosed. The method includes determining that a receiving device is capable of multi-link fragmentation, the receiving device and the transmitting device are operable to communicate over a first wireless link and a second wireless link, determining a first media access control (MAC) protocol data unit (MPDU) length capability of the receiving device for the first wireless link and a second MPDU length capability of the receiving device for the second wireless link, and transmitting a first frame over the first wireless link and transmitting a second frame over the second wireless link to the receiving device in the multi-link operation.

According to some embodiments, the method includes determining that a length of the A-MSDU is larger than the first MPDU length capability, and fragmenting an aggregate MAC protocol service unit (A-MSDU) into a first fragmented frame and a second fragmented frame according to the MPDU length capabilities, the A-MSDU is fragmented using fragments that are smaller than the MPDU length capability of the first wireless link, and the first frame includes the first fragmented frame and the second frame comprises the second fragmented frame.

According to some embodiments, a length of the A-MSDU is greater than at least one of the first MPDU length capability and the second MPDU length capability, a length of the first fragmented frame is not greater than the first MPDU length capability, and a length of the second fragmented frame is not greater than the second MPDU length capability.

According to some embodiments the transmitting the first frame over the first wireless link is performed simultaneously with transmitting the second frame over the second wireless link.

According to some embodiments the first frame and the second frame are associated with the same traffic identifier (TID) allocated to the first wireless link and the second wireless link.

According to some embodiments, the method includes receiving an extended capabilities element from the receiving device including an A-MSDU capability requirement, and aggregating the A-MSDU to satisfy the A-MSDU capability requirement of the extended capabilities element.

According to some embodiments the receiving device is further operable to communicate over a third wireless link, and the aggregating the A-MSDU to satisfy the A-MSDU capability of the extended capabilities element includes identifying an eligible link set that satisfies the A-MSDU capability of the extended capabilities element, the eligible link set includes at least one of: the first wireless link; the second wireless link; and the third wireless link.

According to some embodiments the first wireless link includes a 2.4 GHz wireless link, the second wireless link includes a 5 GHz wireless link, and the third wireless link includes a 6 GHz wireless link.

According to a different embodiment, a method of transmitting data to a receiving device by a transmitting device in a multi-link operation over a wireless network is disclosed. The method includes receiving a transmission opportunity (TXOP) on a first wireless link at a first wireless station (STA) instance of a plurality of wireless STA instances of the transmitting device, setting a SA field of an aggregate media access control (MAC) protocol service unit (A-MSDU) sub-frame header of the A-MSDU according to a virtual MAC address of an logical link control (LLC) sublayer interface of the transmitting device, setting a DA field of the A-MSDU sub-frame header of the A-MSDU according to a virtual MAC address of an LLC sublayer interface of the receiving device for delivering the A-MSDU to an LLC sublayer of the receiving device, and transmitting the A-MSDU to the receiving device over the first wireless link.

According to some embodiments, the method includes setting a TA field of a MAC header of the A-MSDU according to a MAC address of the first wireless STA instance, and setting an RA field of the MAC header of the A-MSDU according to a MAC address of a wireless AP instance of the receiving device.

According to some embodiments, the method includes receiving a transmission opportunity (TXOP) on a second wireless link at a second wireless STA instance of the plurality of wireless STA instances of the transmitting device, setting a SA field of an A-MSDU sub-frame header of a second A-MSDU according to the virtual MAC address of the LLC sublayer interface of the transmitting device, setting a DA field of the A-MSDU sub-frame header of the second A-MSDU according to the virtual MAC address of the LLC sublayer interface of the receiving device for delivering the second A-MSDU to the LLC sublayer of the receiving device, and transmitting the second A-MSDU to the receiving device over the second wireless link.

According to some embodiments, the first A-MSDU is transmitted simultaneously with the second A-MSDU.

According to some embodiments, the virtual MAC address of the LLC sublayer interface of the transmitting device corresponds to a MAC address of a wireless STA instance of the plurality of wireless STA instances.

According to some embodiments the virtual MAC address of the LLC sublayer of the receiving device corresponds to a MAC address of a wireless AP instance of the receiving device.

According to another embodiment, an apparatus for transmitting data to a receiving device in a multi-link operation over a wireless network. The apparatus includes a multi-band wireless station (STA) including a plurality of wireless STA instances, each wireless STA instance of the plurality of wireless STA instances is associated with a respective media access control (MAC) address, and an logical link control (LLC) sublayer interface associated with a first MAC address of a first wireless STA instance of the plurality of wireless STA instances. The multi-band wireless STA is operable to receive a transmission opportunity (TXOP) for transmitting an aggregate MAC protocol service unit (A-MSDU) at a second wireless STA instance of a plurality of wireless STA instances of the transmitting device, set an SA field of an A-MSDU sub-frame header of the A-MSDU according to a virtual MAC address of the LLC sublayer interface of the transmitting device, set a DA field of the A-MSDU sub-frame header of the A-MSDU according to a virtual MAC address of an LLC sublayer interface of the receiving device for delivering the A-MSDU to an LLC sublayer of the receiving device, and transmit the A-MSDU to the receiving device using the virtual MAC addresses in the A-MSDU sub-frame header According to some embodiments, the multi-band wireless STA is further operable to aggregate the A-MSDU for transmission using the A-MSDU sub-frame header According to some embodiments, the multi-band wireless STA is further operable to aggregate the A-MSDU according to an A-MSDU capability requirement the receiving device According to some embodiments, the A-MSDU capability requirement of the receiving device includes a maximum mac protocol data unit (MPDU) length, and the STA is further operable to aggregate the A-MSDU using a length that satisfies the A-MSDU capability requirement.

According to some embodiments the plurality of wireless STA instances communicate with the receiving device over a plurality of wireless links, and the multi-band wireless STA is further operable to aggregate the A-MSDU according to an A-MSDU capability requirement of the receiving device by determining an eligible link set of the plurality of wireless links that satisfy the A-MSDU capability requirement of the receiving device.

According to some embodiments, the A-MSDU and the second A-MSDU include fragmented frames of the same original A-MSDU.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 is a flow chart of an exemplary computer implemented process for transmitting data in a multi-link operation using an A-MSDU according to embodiments of the present invention.

FIG. 9 is a block diagram depicting an exemplary computer system platform upon which embodiments of the present invention may be implemented.

DETAILED DESCRIPTION

Figure 1:
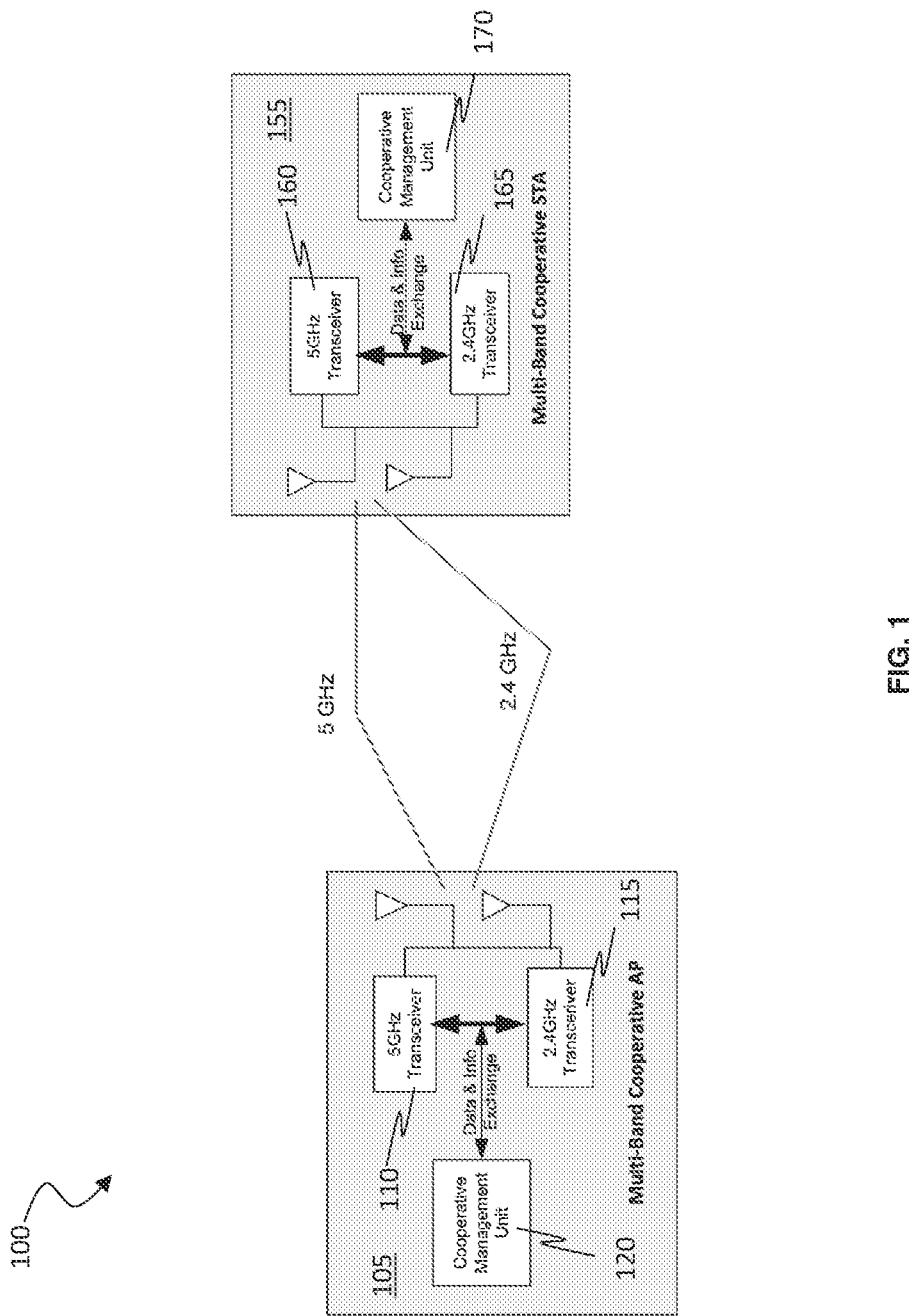
FIG. 1 is a block diagram of an exemplary wireless communication system including a multi-band cooperative AP and a multi-band cooperative STA according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 7-8) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel Techniques for EHT Multi-Band a-MSDU Operation

As used herein, the term "EHT" refers generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Multi-link operations can provide higher network throughput and improved network flexibility compared to traditional techniques for wireless communication. Embodiments of the present invention provide techniques for simultaneously transmitting frames of an A-MSDU over multiple links in a multi-link operation between wireless devices (e.g., a wireless STA and a wireless AP). The A-MSDU can be aggregated to satisfy capability requirements of the transmitting device and/or the receiving device. Moreover, the A-MSDU can be fragmented, for example, to satisfy an MPDU length requirement of the transmitting device and/or the receiving device. Some embodiments disclosed herein use a virtual mac address of an LLC sublayer interface to define parameters values of an A-MSDU sub-frame header (e.g., SA and DA) for routing the respective frame to the LLC sublayer.

With regard to FIG. 1, an exemplary wireless communication system 100 including a multi-band cooperative AP 105 and a multi-band cooperative STA 155 are depicted according to embodiments of the present invention. The multi-band cooperative AP 105 includes a 5 GHz transceiver 110 and a 2.4 GHz transceiver 115. Other types of transceivers that operate on different bands, such as 6 GHz and above, can also be used by the multi-band cooperative AP 105 according to embodiments of the present invention. The transceivers 110 and 115 of AP 105 exchange data and information with cooperative management unit 120 that coordinates information sent and/or received by transceivers 110 and 115.

The multi-band cooperative ST 155 includes a 5 GHz transceiver 160 and a 2.4 GHz transceiver 165. Other types of transceivers that operate on different bands, such as 6 GHz and above, can also be used by the multi-band cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively, although any well-known wireless communication band (e.g., 6 GHz) can be used.

The multi-band cooperative AP 105 and the multi-band cooperative STA 155 have simultaneous transmission and reception capabilities for communicating using different wireless bands. The transmitters operating on the different bands can perform independent clear channel assessments (CCAs) using joint or intendent transmissions. Moreover, full duplex communication can be enabled by independent multi-band operation using FDD mode.

STA 155 transmitting frames using multiple bands simultaneously can mitigate delay and improve peak throughput of STA 155. However, in some cases, transmitting frames using multiple bands simultaneously can degrade the performance of the basic service set (BSS) comprising STA 155. For example, the performance of the BSS can be degraded when STA 155 operating on multiple bands simultaneously uses a substantial amount of the bandwidth available to the BSS due to the increased traffic. Therefore, the AP 105 can control which STAs are granted multi-band channel access, and the access can be terminated by the AP at any time, for example, based on changing network conditions or requirements.

Depending on certain conditions, such as traffic load, a non-AP STA may use fewer than all supported/available links in order to reduce energy consumption. Moreover, a non-AP STA may apply an independent power management for each link, and the AP can provide the TID-to-link mapping information for each link. Depending the Quality of Service (QoS) policy of the Basic Service Set (BSS), an AP may allocate the traffic to different links based on traffic type, such as voice, video, data, etc. For example, frames belonging to a first Traffic Identifier (TID 1) can be allocated to a first link, and frames belonging to a second Traffic Identifier (TID 2) can be allocated to a second link. In this case, the AP may provide the TID-to-link mapping information for both links to the wireless STA, where some data can only be sent on the first link, and other data can only be sent on the second link.

Data transmitted over a first wireless link, such as the 5 GHz wireless link provided by 5 GHz transceiver 110 or 160, can be retransmitted over a different wireless link. For example, if a data transmission over the 5 GHz wireless link is sent unsuccessfully (e.g., no acknowledgment received), the data can be retransmitted over the 2.4 GHz wireless link provided by 2.4 GHz transceiver 115/165. The data transmission (e.g., a PPDU) can be originally encoded for transmission on a first wireless link (e.g., a 2.4 GHz or 5 GHz wireless link), and the retransmitted data can be prepared for transmission according to embodiments of the present invention described herein for encrypting data for retransmission in a multi-link environment.

Figure 2:
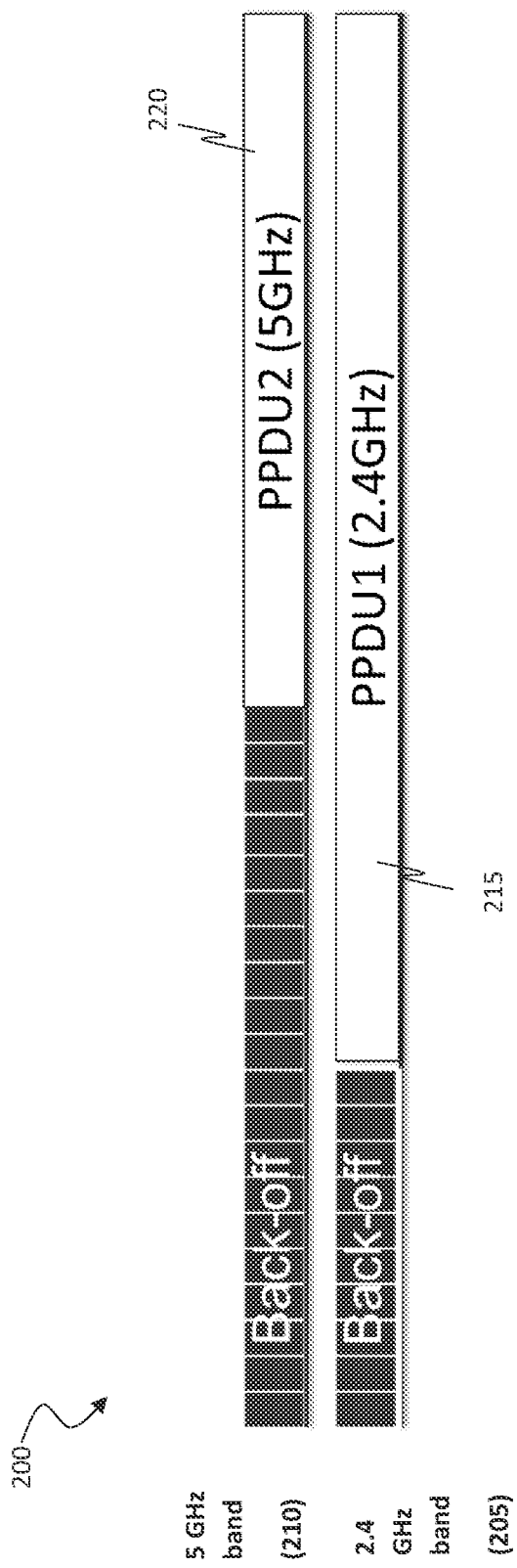
FIG. 2 is a block diagram of an exemplary multi-link operation performed by a wireless STA according to embodiments of the present invention.

FIG. 2 is a block diagram of an exemplary multi-link operation performed by a wireless STA according to embodiments of the present invention. The wireless STA obtains a transmission opportunity (TXOP) in multiple bands, including a 2.4 GHz wireless band 205 and a 5 GHz wireless band 210. When the wireless STA obtains TXOPs in multiple bands, the STA can transmit frames in multiple bands simultaneously. As depicted in FIG. 2, the wireless STA transmits PPDU1 (215) over 2.4 GHz wireless band 205 and PPDU2 (220) over 5 GHz wireless band 210 concurrently. As mentioned above, transmitting data over multiple links simultaneously according to embodiments of the present invention can mitigate delay and improve peak throughput of the wireless STA.

Figure 3:
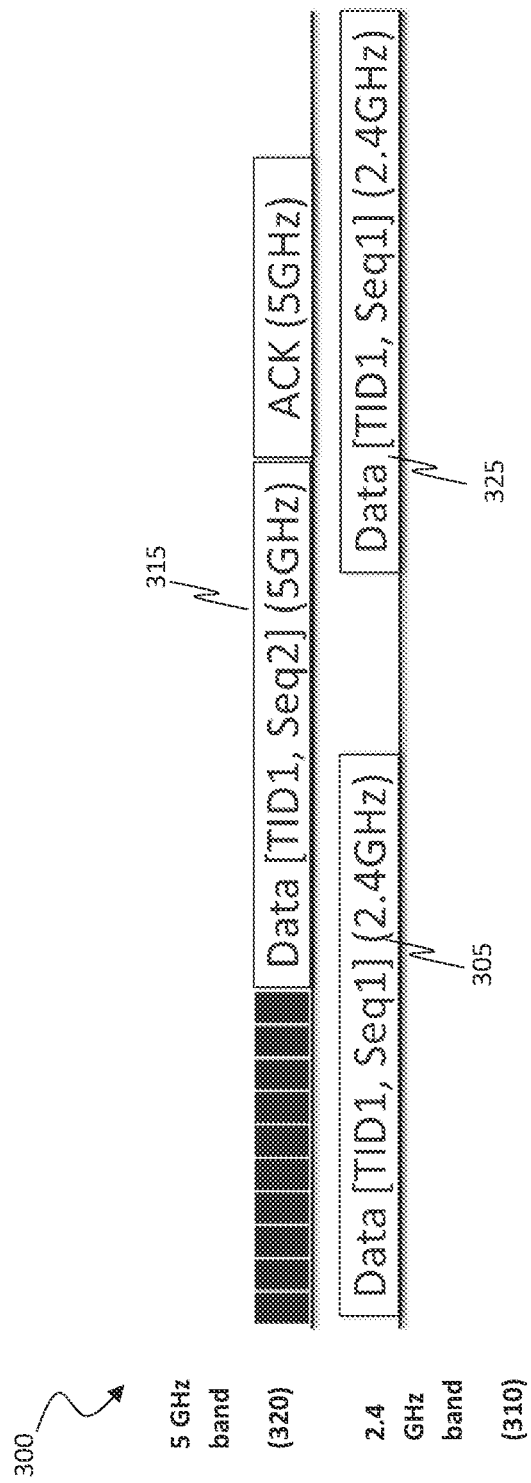
FIG. 3 is a block diagram of an exemplary multi-link operation using traffic identifiers performed by a wireless STA according to embodiments of the present invention.

FIG. 3 is a block diagram of an exemplary multi-link operation using traffic identifiers (TIDs) performed by a wireless STA according to embodiments of the present invention. When the transmitted frames are under a block ack agreement, the add block acknowledgment (ADDBA) request frame can include more than one multi-band information element indicating the bands on which a wireless STA can send frames of the TID indicated in the ADDBA Request frame. When an STA is transmitting frames in one or more bands ("ongoing bands") and schedules a new frame transmission in a different band using frames under a block ack agreement, the STA chooses the scheduled frame from the same TID as the ongoing frame if the reordering buffer for the TID of the ongoing frame is available. Otherwise, the STA chooses the scheduled frame from a different TID than the ongoing frame.

As depicted in FIG. 3, the STA simultaneously transmits data frame 305 on a 2.4 GHz wireless band 310 and data frame 315 on a 5 GHz wireless band 320. Data frames corresponds to sequence Seq1 and data frame 315 corresponds to sequence Seq2 associated with TID1. The ongoing frame 305 is not under a block ack agreement (no block ack agreement on TID1). In this case, if data frame 305 of sequence Seq1 fails, the STA can retransmit data frame 305 in data frame 325. It is possible that the recipient wireless device will deliver data frame 310 of sequence Seq2 to an upper layer before the recipient device delivers the retransmitted data frame 325 of Seq1 to the upper layer, which can be problematic. To avoid an out of order of delivery of frames to the upper layer (e.g., Seq2 before Seq1), when the frames are not transmitted under a block ACK agreement, the STA schedules a frame from a TID that is different than the TID of the ongoing frame. However, this approach may limit the gains achieved by the multi-link operation.

Alternatively, to maintain the performance capabilities of the multi-link operation, according to some embodiments, the STA schedules a frame from the same TID as the ongoing frame only if the ongoing frame has no retry attempts remaining, and the transmission end time of the scheduled frame is not earlier than the transmission end time of the ongoing frame. Otherwise, the STA schedules a frame having a TID that is different than the TID of the ongoing frame.

To schedule transmission of an aggregate MSDU (A-MSDU), the transmitting STA must define the destination address (DA) and source address (SA) in the A-MSDU sub-frame header for a MSDU transmitted in a multi-link operation. However, because MSDU aggregation is performed prior to the generation of the MPDUs, the DA and SA in the A-MSDU sub-frame header corresponding to the respective MPDU are determined independently on the link where the TXOP is obtained in a multi-link operation. In current MAC data plane architecture, A-MSDU aggregation is one of the first procedures performed at the TX side, and de-aggregation is one of the last procedures performed at the RX side. Accordingly, when an A-MSDU is carried in a QoS Data frame with a normal Ack policy, a wireless STA can support the reception of the A-MSDU sent by a high throughput (HT) STA when the A-MSDU is not aggregated within an A-MPDU (aggregated MPDU), or by a VHT STA when the A-MSDU is sent as a Single MPDU (S-MPDU).

For each block ack agreement, an STA can transmit an A-MSDU within a QoS Data frame under the block ack agreement unless the recipient indicates support for A-MSDU by setting the A-MSDU Supported field to '1' in the BlockAck Parameter Set field of the ADDBA Response frame. As mentioned above, the ADDBA Request frame can include more than one multi-band information element indicating the bands on which a wireless STA can send frames of the TID indicated in the ADDBA Request frame. Importantly, the wireless STA does not transmit an A-MSDU to a recipient wireless STA if the A-MSDU length exceeds the value indicated by the Maximum A-MSDU Length field of the HT Capabilities element received from the recipient STA.

The length of an A-MSDU transmitted in a VHT PPDU is limited by the maximum MPDU size supported by the recipient STA. Further, a VHT STA cannot transmit an A-MSDU that includes a number of MSDUs greater than the value indicated by the Max Number of MSDUs in an A-MSDU field of any Extended Capabilities element sent by the recipient STA, and an HT STA cannot transmit an A-MSDU that includes a number of MSDUs greater than the value indicated by the Max Number of MSDUs in an A-MSDU field of any Extended Capabilities element sent by the recipient STA.

Figure 4:
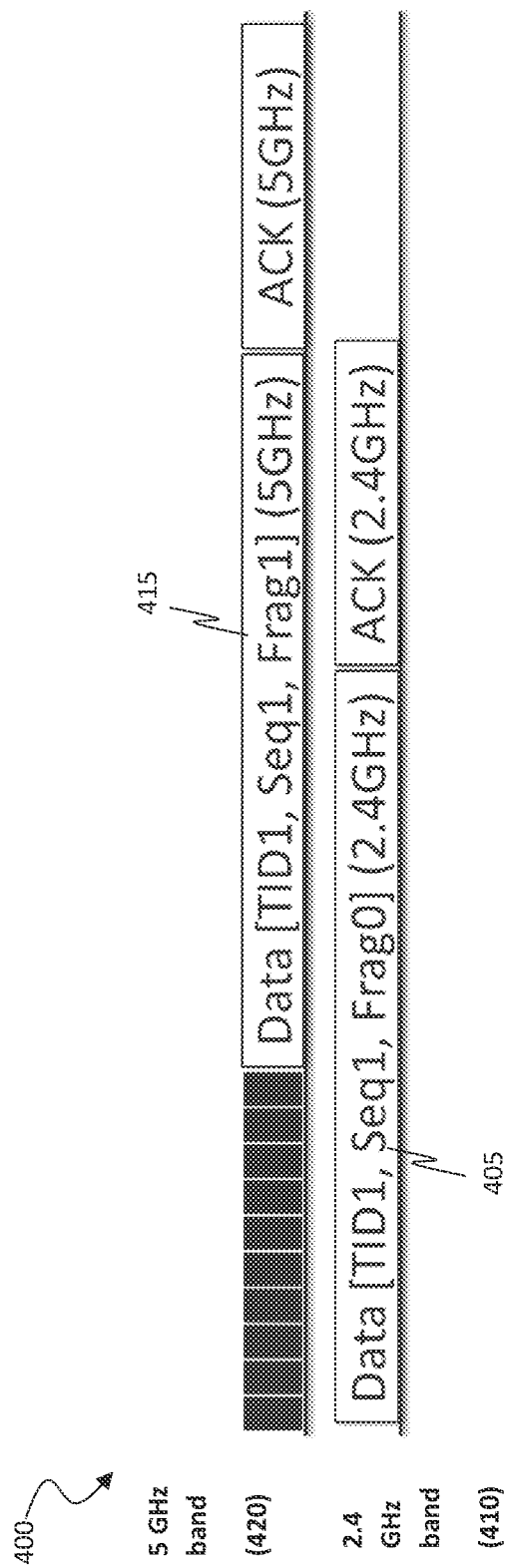
FIG. 4 is a block diagram of an exemplary multi-link operation using multiple fragmented frames according to embodiments of the present invention.

FIG. 4 is a block diagram of an exemplary multi-link operation using multiple fragmented frames according to embodiments of the present invention. When a multi-band STA supports a dynamic fragmentation, it can perform fragmentation of an A-MSDU having a length that does not satisfy the Maximum MPDU Length capability of a link. Fragmentation is typically performed after A-MSDU aggregation. When a frame is fragmented, all segments carrying the fragmented frames are sent through one link unless the recipient STA supports the multi-link fragmentation. When the recipient STA indicates support for multi-link fragmentation, the transmitting multi-band STA can simultaneously send fragmented frames over multiple links when the Maximum MPDU Length capability of the link is greater than or equal to the size of the fragmented frames.

When an ongoing frame is a fragmented frame, the STA can choose one of the remaining fragmented frames to schedule for transmission. As depicted in FIG. 4, the STA transmits ongoing data frame 405 including fragment Frag0 of sequence Seq1 (associated with TID0 over 2.4 GHz wireless link 410, and schedules data frame 415 including fragment Frag1 of sequence Seq1 (also associated with TID0 for transmission over 5 GHz wireless link 420 when the Maximum MPDU Length capability of the 5 GHz link is greater than or equal to the size of the fragmented frame 415.

According to some embodiments, the fragmentation parameters (e.g., frame size) cannot be changed. If the length of the MPDU carrying the remaining fragmented frame is greater than the Maximum MPDU Length capability of another link, the remaining fragmented frame cannot be transmitted on that link. Moreover, when an initial transmission of a frame is not fragmented, any retransmission of that frame also cannot be fragmented. Accordingly, if the MPDU length of the initial transmission is greater than the Maximum MPDU Length capability of another link, the frame cannot be retransmitted on that link.

Figure 5:
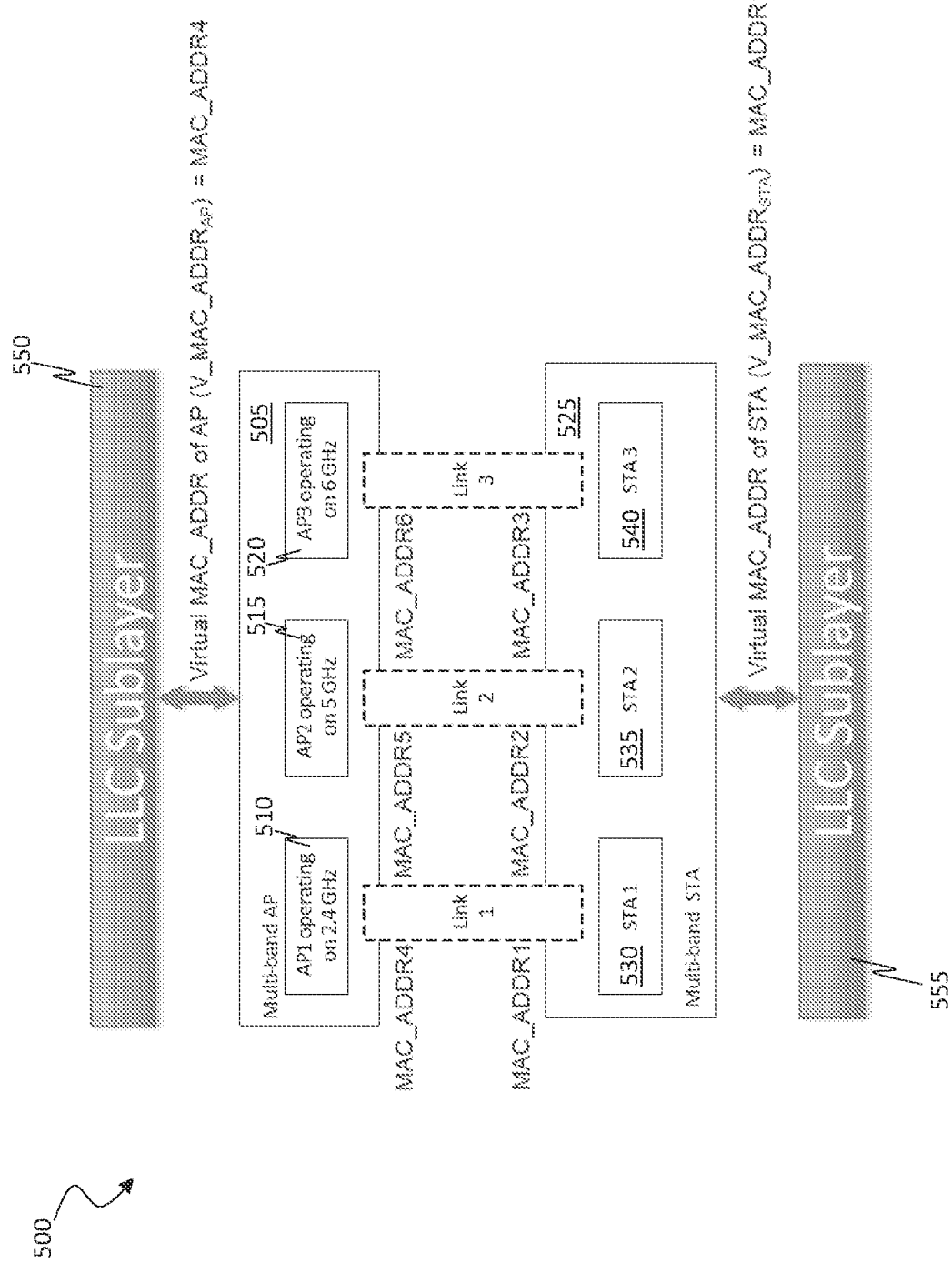
FIG. 5 is a block diagram of an exemplary wireless computer system for performing multi-link operations using a virtual MAC address for setting the RA or TA parameter value in a MAC header of a respective A-MSDU according to embodiments of the present invention.

FIG. 5 is a block diagram of an exemplary wireless computer system 500 for performing multi-link operations using a virtual MAC address for setting the RA or TA parameter value in a MAC header of a respective A-MSDU according to embodiments of the present invention. Multi-band wireless AP 505 includes multiple AP instances AP1 510, AP2 515, and AP3 520 capable of performing multi-band operations, including transmitting or receiving frames simultaneously over multiple bands. Multi-band wireless STA 525 includes multiple STA instances STA1 530, STA2 535, and STA3 540 capable of performing multi-band operations, including sending or receiving frames simultaneously over multiple bands. AP1 510 and STA1 530 communicate over a 2.4 GHz wireless link (Link 1), AP2 515 and STA2 535 communicate over a 5 GHz wireless link (Link 2), and AP3 520 and STA1 540 communicate over a 6 GHz wireless link (Link 3).

Logical Link Control (LLC) sublayers 550 and 555, are coupled to Multi-band AP 505 and multi-band STA 510, respectively. LLC sublayer 550 is assigned a virtual MAC address $V\_MAC\_ADDR_{AP}$ and LLC sublayer 555 is assigned a virtual MAC address $V\_MAC\_ADDR_{STA}$. The LLC sublayers 550 and 555 communicate with the multiple AP and STA instances (e.g., MAC/PHY entities) using the interface associated with the respective Virtual MAC address. Multi-band wireless AP 505 includes MAC/PHY entities configured as wireless AP instances 510, 515, and 520 that operate over different bands, and multi-band wireless STA 525 includes MAC/PHY entities configured as wireless STA instances 530, 535, and 540 that operate over the different bands. As depicted in FIG. 5, the value of the virtual MAC addresses is assigned to correspond to a MAC address of one of the MAC/PHY entities, such as MAC_ADDR4 associated with AP1 510 (AP side) and MAC_ADDR1 associated with STA 530 (STA side).

When wireless multi-band STA 510 sends MPDUs on multiple links, the receiver address (RA) and transmitter address (TA) values of the MAC header of the respective A-MSDU are decided after the STA obtains the TXOP. In this example, the MAC address associated with the MAC/PHY entity of the link on which wireless multi-band STA 510 obtains the TXOP is used to set the RA and the TA parameter values of the MAC header of the frame to be transmitted over Link 3. In order to send frames to the multi-band AP 505 over Link 3 that will be routed to the interface of LLC Sublayer 550, the multi-band STA 510 sets the RA field in the MAC header of the A-MSDU to MAC_ADDR6 and the TA field in the MAC header of the A-MSDU to MAC_ADDR3.

Under existing approaches to frame aggregation, the DA and SA parameter values in the sub-frame header of A-MSDU sub-frames should be set to the same RA and the TA parameter values in the MAC header of the A-MSDU. However, because the MSDU aggregation is performed before MPDU generation, the DA and SA in the A-MSDU sub-frame headers must be determined independently for the specific link on which the TXOP is obtained in a multi-link operation. Accordingly, in the example of FIG. 5, the SA parameter value of the A-MSDU sub-frame header is set to virtual mac address $V\_MAC\_ADDR_{STA}$ (corresponding to MAC_ADDR1), and the DA parameter value of the A-MSDU sub-frame header is set to virtual mac address $V\_MAC\_ADDR_{AP}$ (corresponding to MAC_ADDR4). It is to be appreciated that the virtual MAC address can be set to any of the MAC address of the MAC/PHY entities. In this way, a received frame is delivered to the LLC sublayer interface using the virtual MAC address, and the LLC sublayer can pass the received data to a higher sublayer (e.g., network layer).

According to some embodiments, each MAC entity of the recipient STA can have different A-MSDU capabilities and configurations. For example, each MAC entity can support a different number of MSDUs that can be carried in an A-MSDU, different maximum MPDU lengths that the STA is capable of receiving, and different maximum A-MSDU lengths that the STA is capable of receiving. Therefore, according to some embodiments, MSDU aggregation is performed to satisfy the A-MSDU capability requirements of all MAC entities of the recipient device. For example, when a recipient STA can receive n and m MSDUs in an A-MSDU sent from the first link and the second link, respectively, the transmitting multi-band STA shall not aggregate more than min (n, m) MSDUs in the A-MSDU to satisfy the capability requirements of both the first link and the second link.

In some cases, satisfying the A-MSDU capability requirements for all MAC entities of the recipient wireless STA can lead to degraded performance. According to some embodiments, to maintain performance levels of the multi-link operation, A-MSDU capability requirements (e.g., maximum number of MSDUs in an A-MSDU, maximum MPDU length, and maximum A-MSDU length) are only satisfied for a specific link or set of links when aggregating the A-MSDU. The specific links that satisfy the selected capability requirements can be referred to as an "eligible link set." When the multi-band STA schedules MPDUs after obtaining a TXOP, the MPDU containing an A-MSDU is limited to transmittion using the eligible link set for transmitting the A-MSDU. For example, a transmitting multi-band STA can aggregate MSDUs while meeting the A-MSDU capability requirements a first link (Link1) only. In this case, the transmitting multi-band STA can schedule the MPDU containing the corresponding A-MSDU on the first link only (Link1). In another example, the transmitting multi-band STA aggregates MSDUs while meeting the A-MSDU capability requirements for both the first link and a second link (Link2). In this case, the transmitting multi-band STA can schedule the MPDU containing the corresponding A-MSDU on both the first link and the second link (Link1+Link2) which are included in the eligible link set.

According to some embodiments, MSDUs belonging to specific a TID are allocated to a specific link or set of links. In this case, the multi-band STA satisfies a set of A-MSDU capability requirements (e.g., Max Number of MSDUs in A-MSDU, Maximum MPDU Length, and Maximum A-MSDU Length) for at least one of the specific links when MSDUs are aggregated to transmit the MSDUs belonging to the TID. The recipient STA can also declare a separate Multi-Band specific A-MSDU capability requirement or set of requirements. The recipient STA can announce its A-MSDU capability requirements in a multi-link setup frame during a multi-link setup negotiation phase, and the transmitting multi-band STA can aggregate the MSDUs of the TID to satisfy the set of the Multi-Band specific A-MSDU capability requirements indicated in the multi-link setup frame.

Figure 6:
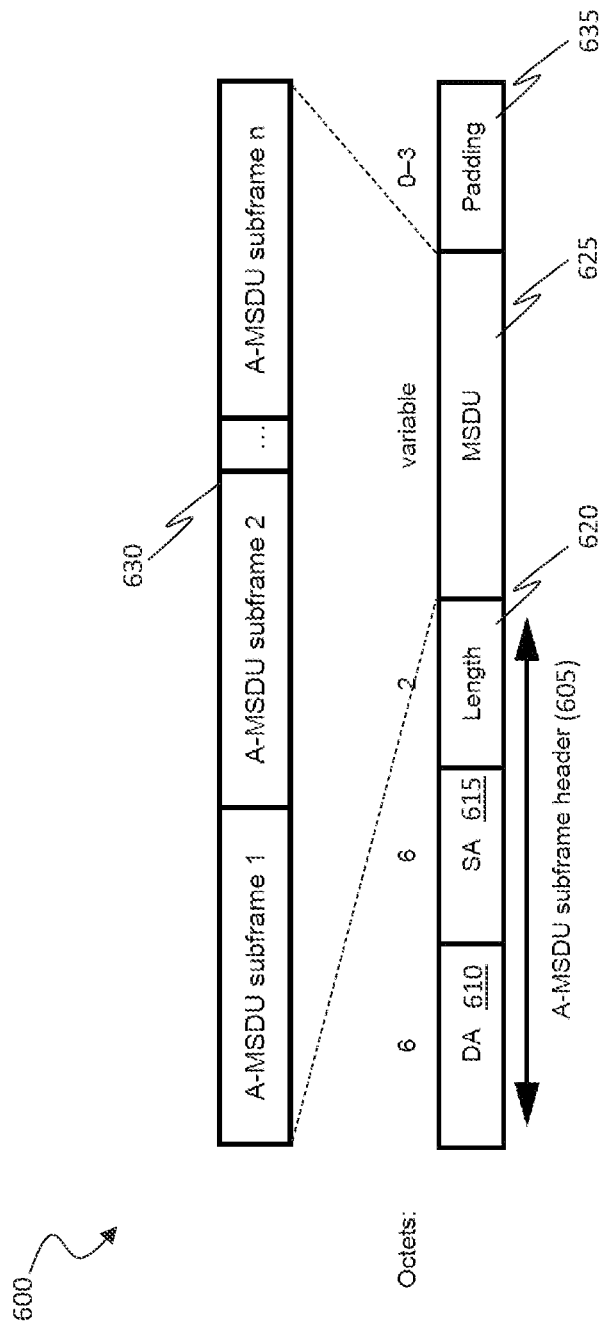
FIG. 6 is a block diagram of an exemplary A-MSDU frame format according to embodiments of the present invention.

FIG. 6 is a block diagram of an exemplary A-MSDU frame format 600 according to embodiments of the present invention. In FIG. 6, exemplary A-MSDU subframes 1-n (630) are depicted. Exemplary A-MPDU subframe n (630) includes MSDU field 625, A-MSDU subframe header 605 including DA field 610 and SA field 615 for setting the destination address and sources addresses of the A-MSDU transmission, respectively, and a length field 620 indicating the length in bits of MSDU field 625. The MSDU frame format 600 includes 3 bytes for padding 635. The exemplary MSDU frame format 600 can be used to implement embodiments of the present invention, for example, to perform EHT multi-band A-MSDU operations, such as transmission of A-MSDUs and/or fragmented frames simultaneously over multiple bands. The A-MSDU frame can be carried in a PSDU, for example.

FIG. 7 is a flow chart of an exemplary computer implemented process 700 for transmitting data in a multi-link operation using an A-MSDU/MSDU according to embodiments of the present invention.

At step 705, capabilities of a receiving device are determined. Step 705 can include receiving an indication of capabilities from the receiving device. The capabilities can include support for multi-link fragmentation, for example. The capabilities can also include MDPU capability requirements, such as MPDU length capability, maximum Number of MSDUs in an A-MSDU, etc.

At step 710, an MPDU length capability of the first wireless link and an MPDU length capability the second wireless link are determined. The MPDU length capability can be associated with the transmitting device or the receiving device. The determining can be made according to an indication of capabilities transmitted by the receiving device, for example.

At step 715, an A-MSDU/MSDU is fragmented into a first fragmented frame and a second fragmented frame according to the MPDU length capabilities.

At step 720, the first fragmented frame and the second fragmented frame of the A-MSDU/MSDU are transmitted to the receiving device simultaneously in the multi-link operation over the wireless network.

Figure 8A:
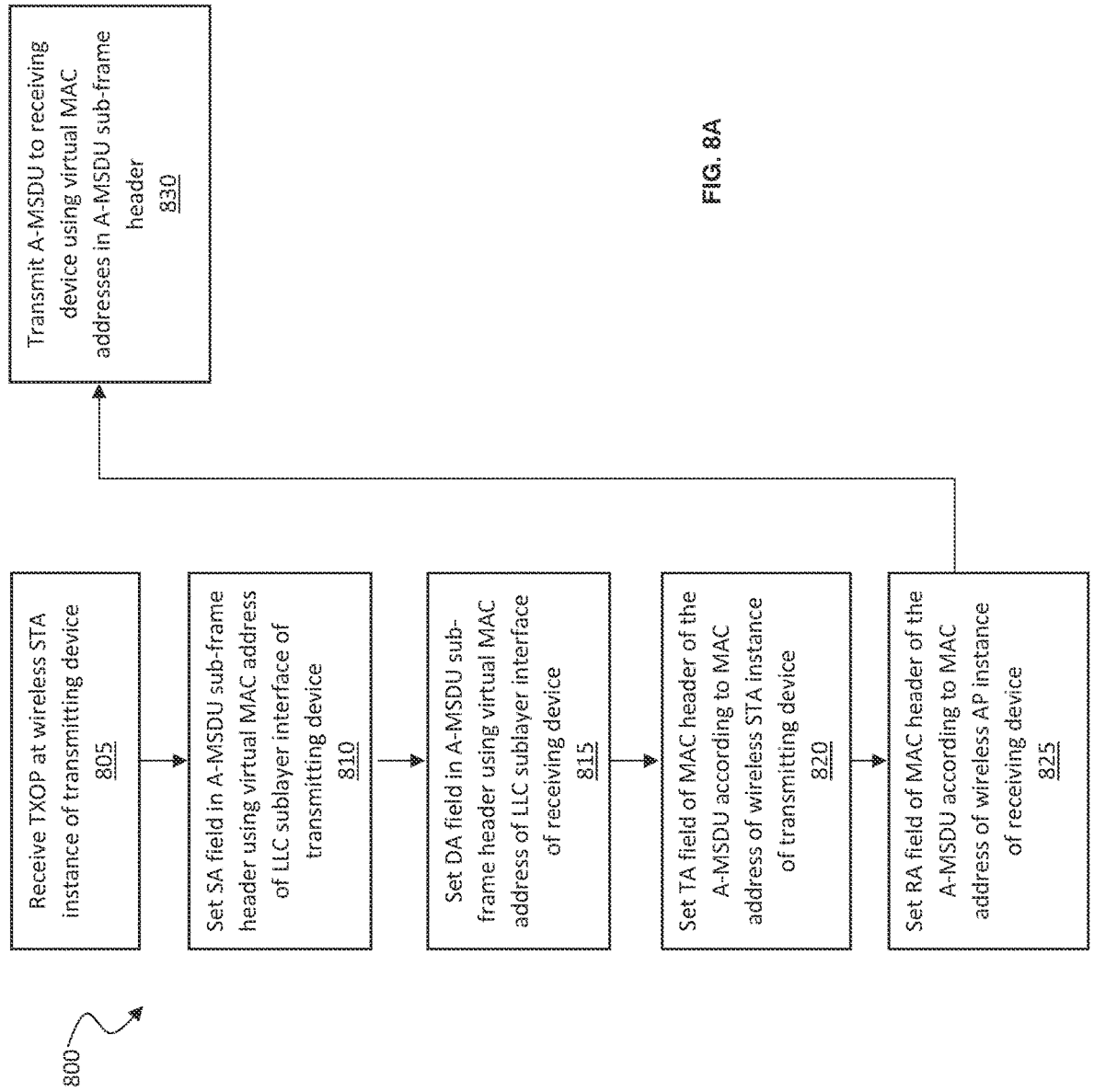
FIG. 8A is a flow chart of an exemplary computer implemented process for uplink data transmission using virtual MAC addresses assigned to LLC sublayer interfaces by a transmitting device according to embodiments of the present invention.

FIG. 8A is a flow chart of an exemplary computer implemented process 800 for uplink transmission of data using virtual MAC addresses assigned to LLC sublayer interfaces by a transmitting device according to embodiments of the present invention. The wireless STA can be a MLD non-AP STA and the wireless AP can be a MLD AP.

At step 805, a TXOP is received on a first wireless link at a first wireless STA instance of the transmitting device.

At step 810, an SA field of one or more A-MSDU sub-frame headers of the A-MSDU are set according to a virtual MAC address of an LLC sublayer interface of the transmitting device.

At step 815, a DA field of the one or more A-MSDU sub-frame headers of the A-MSDU are set according to a virtual MAC address of an LLC sublayer interface of the receiving device for delivering the A-MSDU to an LLC sublayer of the receiving device.

At step 820, a TA field of a MAC header of the A-MSDU is set according to a MAC address of the first wireless STA instance.

At step 825, an RA field of the MAC header of the A-MSDU is set to a MAC address of a wireless AP instance of the receiving device.

Steps 805-825 can be repeated for a second A-MSDU to be transmitted over a second wireless link in order to transmit multiple frames to the receiving device simultaneously in a multi-link operation. For example, another TXOP can be received on the second wireless link at a second wireless STA instance of the transmitting device. An SA field of an A-MSDU sub-frame header of the second A-MSDU is set according to the virtual MAC address of the LLC sublayer interface of the transmitting device, and the DA field of the A-MSDU sub-frame header of the second A-MSDU is set according to the virtual MAC address of the LLC sublayer interface of the receiving device for delivering the A-MSDU to an LLC sublayer of the receiving device. The TA field of a MAC header of the second A-MSDU is set according to a MAC address of a second wireless STA instance of the transmitting device, and an RA field of the MAC header of the second A-MSDU is set to a MAC address of a second wireless AP instance of the receiving device.

At step 830, the A-MSDU is transmitted by the transmitting device to the receiving device using the virtual MAC addresses in the AMPDU sub-frame headers over the first wireless link. Step 845 can also include transmitting the second A-MSDU to the receiving device using the virtual MAC addresses over the second wireless link concurrently with the transmission of the A-MSDU over the first wireless link in a multi-link operation.

Figure 8B:
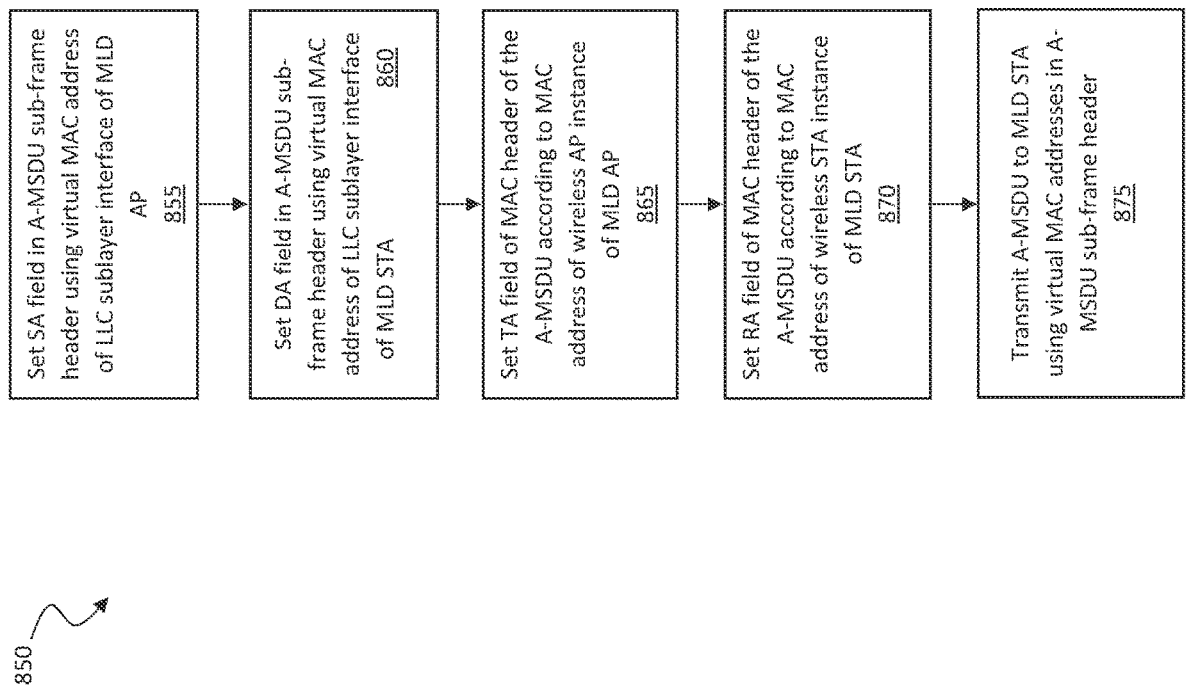
FIG. 8B is a flow chart of an exemplary computer implemented process for downlink data transmission using virtual MAC addresses assigned to LLC sublayer interfaces by a receiving device according to embodiments of the present invention.

FIG. 8B is a flow chart of an exemplary computer implemented process 850 for downlink transmission of data using virtual MAC addresses assigned to LLC sublayer interfaces by a transmitting device according to embodiments of the present invention. The wireless STA can be a MLD non-AP STA and the wireless AP can be a MLD AP.

At step 855, an SA field of one or more A-MSDU sub-frame headers of the A-MSDU are set according to a virtual MAC address of an LLC sublayer interface of the the MLD AP.

At step 860, a DA field of the one or more A-MSDU sub-frame headers of the A-MSDU are set according to a virtual MAC address of an LLC sublayer interface of the MLD non-AP STA for receiving the A-MSDU to an LLC sublayer of the receiving device.

At step 865, a TA field of a MAC header of the A-MSDU is set according to a MAC address of a first wireless AP instance of the wireless MLD AP.

At step 870, an RA field of the MAC header of the A-MSDU is set to a MAC address of a wireless STA instance of the MLD non-AP STA.

Steps 855-870 can be repeated for a second A-MSDU to be transmitted over a second wireless link in order to transmit multiple frames to the receiving device simultaneously in a multi-link operation as described above.

At step 875, the A-MSDU is transmitted by the MLD AP to the MLD non-AP STA using the virtual MAC addresses in the AMPDU sub-frame headers over the first wireless link. Step 845 can also include transmitting a second A-MSDU to the receiving device using the virtual MAC addresses over the second wireless link concurrently with the transmission of the A-MSDU over the first wireless link in a multi-link operation.

Exemplary Computer Controlled System

Embodiments of the present invention are drawn to electronic systems that perform multi-link operations in a wireless network. The multi-link operations can include aggregating MPDUs and transmitting or receiving A-MSDUs over multiple wireless links simultaneously, such as the exemplary A-MSDU sub-frame depicted in FIG. 6. The aggregating can include setting parameter values of an A-MSDU sub-frame header to correspond to a virtual MAC address of an LLC sublayer and can be performed according to capability requirements of a transmitting device and/or a receiving device. The following discussion describes one such exemplary electronic system or computer system that can be used as a platform for implementing embodiments of the present invention. The exemplary computer system 912 can be a wireless access point or a wireless station, for example.

In the example of FIG. 9, the exemplary computer system or wireless device includes a central processing unit (such as a processor or a CPU) 901 for running software applications and optionally an operating system. Read-only memory 902 and random access memory 903 store applications and data for use by the CPU 901. Data storage device 904 provides non-volatile storage for applications and data and may include fixed disk drives, removable disk drives, flash memory devices, and CD-ROM, DVD-ROM or other optical storage devices. The optional user inputs 906 and 907 comprise devices that communicate inputs from one or more users to the computer system 912 (e.g., mice, joysticks, cameras, touch screens, and/or microphones).

A communication or network interface 908 includes a plurality of transceivers and allows the computer system 912 to communicate with other computer systems, networks, or devices via an electronic communications network, including wired and/or wireless communication and including an Intranet or the Internet (e.g., 802.11 wireless standard). The network interface 908 can perform multi-link operations (e.g., multi-link packet scheduling and channel access) using multiple wireless links to improve network throughput, for example. According to embodiments of the present invention, the communication or network interface 908 can operate multiple transceivers simultaneously. The communication or network interface 908 and can include a multi-band (e.g., dual-band) interface that can operate in multiple bands simultaneously, such as 2.4 GHz, 5 GHz, and/or 6 GHz.

The optional display device 910 may be any device capable of displaying visual information in response to a signal from the computer system 912 and may include a flat panel touch sensitive display, for example, and may be remotely disposed. The components of the computer system 912, including the CPU 901, memory 902/903, data storage 904, user input devices 906, and graphics subsystem 905 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of transmitting data by a transmitting device in a multi- link operation over a wireless network, the method comprising:
   determining that a receiving device is capable of multi-link fragmentation, wherein the receiving device and the transmitting device are operable to communicate over a first wireless link and a second wireless link;
   determining a first media access control (MAC) protocol data unit (MPDU) length capability of the receiving device for the first wireless link and a second MPDU length capability of the receiving device for the second wireless link;
   fragmenting an A-MSDU into a first frame and a second frame according to the first and second MPDU length capabilities, respectively, wherein the first frame comprises a first fragmented frame and the second frame comprises a second fragmented frame;
   generating a virtual MAC address for transmitting the first fragmented frame and the second fragmented frame for receipt by a logical link control (LLC) sublayer of the receiving device; and
   transmitting the first frame over the first wireless link and transmitting the second frame over the second wireless link to the receiving device in the multi-link operation using the virtual MAC address, wherein the first frame comprises a first traffic identifier (TID), and wherein the transmitting the first frame over the first wireless link is performed with transmitting the second frame over the second wireless link; and
   scheduling a third frame for transmission over the first wireless link, wherein the third frame comprises the TID of the first frame if the first wireless link is without retry attempts, and wherein the third frame comprises a TID different than the TID of the first wireless link if the first wireless link has retry attempts remaining.

2. The method as described in claim 1, further comprising determining that a length of the A-MSDU is larger than the first MPDU length capability.

3. The method as described in claim 2, wherein a length of the first fragmented frame is not greater than the first MPDU length capability, and wherein a length of the second fragmented frame is not greater than a second MPDU length capability.

4. The method as described in claim 1, wherein the first frame and the second frame are associated with the same traffic identifier (TID) allocated to the first wireless link and the second wireless link.

5. The method as described in claim 1, further comprising:
receiving an extended capabilities element from the receiving device comprising an A-MSDU capability requirement; and
aggregating the A-MSDU to satisfy the A-MSDU capability requirement of the extended capabilities element.

6. The method as described in claim 5, wherein the receiving device is further operable to communicate over a third wireless link, and wherein the aggregating the A-MSDU to satisfy the A-MSDU capability of the extended capabilities element comprises identifying an eligible link set that satisfies the A-MSDU capability of the extended capabilities element, wherein the eligible link set comprises at least one of: the first wireless link; the second wireless link; and the third wireless link.

7. The method as described in claim 6, wherein the first wireless link comprises a 2.4 GHz wireless link, the second wireless link comprises a 5 GHz wireless link, and the third wireless link comprises a 6 GHz wireless link.

8. The method of claim 1, further comprising generating an ADD using the MAC address, wherein the ADD is operable to encrypt at least one of: the first fragmented frame; and the second fragmented frame.

9. A method of transmitting data to a receiving device by a transmitting device in a multi-link operation over a wireless network, the method comprising:
receiving a first transmission opportunity (TXOP) on a first wireless link at a first wireless station (STA) instance of a plurality of wireless STA instances of the transmitting device for transmitting frames having a first traffic identifier (TID);
setting a sender address (SA) field of an aggregate media access control (MAC) protocol service unit (A-MSDU) sub-frame header of a first A-MSDU according to a virtual MAC address of an logical link control (LLC) sublayer interface of the transmitting device
setting a destination address (DA) field of the A-MSDU sub-frame header of the first A-MSDU according to a virtual MAC address of an LLC sublayer interface of the receiving device for delivering the first A-MSDU to an LLC sublayer of the receiving device;
receiving a second transmission opportunity (TXOP) on a second wireless link at a second wireless STA instance of the plurality of wireless STA instances of the transmitting device for transmitting frames having to a second traffic identifier (TID);
transmitting the first A-MSDU comprising the first TID to the receiving device over the first wireless link during the first TXOP according to A-MSDU capability requirements of the first wireless link; and
transmitting a second A-MSDU comprising the second TID to the receiving device over the second wireless link during the second TXOP according to A-MSDU capability requirements of the second wireless link, wherein the first A-MSDU is transmitted with the second A-MSDU when the A-MSDU capability requirements of both the first wireless link and the second wireless link are satisfied.

10. The method as described in claim 9, further comprising:
setting a transmitter address (TA) field of a MAC header of the first A-MSDU according to a MAC address of the first wireless STA instance; and
setting an receiver address (RA) field of the MAC header of the first A-MSDU according to a MAC address of a wireless AP instance of the receiving device.

11. The method as described in claim 9, further comprising:
setting a SA field of an A-MSDU sub-frame header of the second A-MSDU according to the virtual MAC address of the LLC sublayer interface of the transmitting device;
setting a DA field of the A-MSDU sub-frame header of the second A-MSDU according to the virtual MAC address of the LLC sublayer interface of the receiving device for delivering the second A-MSDU to the LLC sublayer of the receiving device.

12. The method as described in claim 9, wherein the virtual MAC address of the LLC sublayer of the receiving device corresponds to a MAC address of a wireless AP instance of the receiving device.

13. An apparatus for transmitting data to a receiving device in a multi-link operation over a wireless network, the apparatus comprising:
a multi-band wireless station (STA) comprising a plurality of wireless STA instances, wherein each wireless STA instance of the plurality of wireless STA instances is associated with a respective media access control (MAC) address; and
a logical link control (LLC) sublayer interface associated with a first MAC address of a first wireless STA instance of the plurality of wireless STA instances,
wherein the multi-band wireless STA is operable to:
receive a first transmission opportunity (TXOP) for transmitting a first aggregate MAC protocol service unit (A-MSDU) at a second wireless STA instance of a plurality of wireless STA instances of the transmitting device;
set a sender address (SA) field of an A-MSDU sub-frame header of the first A-MSDU according to a virtual MAC address of the LLC sublayer interface of the transmitting device;
set a destination address (DA) field of the A-MSDU sub-frame header of the first A-MSDU according to a virtual MAC address of an LLC sublayer interface of the receiving device for delivering the A-MSDU to an LLC sublayer of the receiving device;
receive a second transmission opportunity (TXOP) on a second wireless link at a second wireless STA instance of the plurality of wireless STA instances of the transmitting device for transmitting frames having to a second traffic identifier (TID);
transmit the first A-MSDU comprising the first TID to the receiving device over the first wireless link during the first TXOP according to the first TID and A-MSDU capability requirements of the first wireless link; and
transmit a second A-MSDU comprising the second TID to the receiving device over the second wireless link during the second TXOP according to the second TID and A-MSDU capability requirements of the second wireless link, wherein the first A-MSDU is transmitted with the second A-MSDU when the A-MSDU capability requirements of both the first wireless link and the second wireless link are satisfied.

14. The apparatus as described in claim 13, wherein the multi-band wireless STA is further operable to aggregate the first A-MSDU for transmission using the A-MSDU subframe header.

15. The apparatus as described in claim 14, wherein the multi-band wireless STA is further operable to aggregate the first A-MSDU according to an A-MSDU capability requirement the receiving device.

16. The apparatus as described in claim 15, wherein the A-MSDU capability requirement of the receiving device comprises a maximum mac protocol data unit (MPDU) length, and wherein the STA is further operable to aggregate the first A-MSDU using a length that satisfies the A-MSDU capability requirement.

17. The apparatus as described in claim 15, wherein the plurality of wireless STA instances communicate with the receiving device over a plurality of wireless links, and wherein the multi-band wireless STA is further operable to aggregate the first A-MSDU according to an A-MSDU capability requirement of the receiving device by determining an eligible link set of the plurality of wireless links that satisfy the A-MSDU capability requirement of the receiving device.

* * * * *